(12) United States Patent
Kim et al.

(10) Patent No.: US 9,445,001 B2
(45) Date of Patent: Sep. 13, 2016

(54) METHOD OF REPRODUCING MULTIPLE SHUTTER SOUND AND ELECTRIC DEVICE THEREOF

(71) Applicant: Samsung Electronics Co., Ltd., Gyeonggi-do (KR)

(72) Inventors: Mingyu Kim, Gyeonggi-do (KR); Woohyun Baek, Gyeonggi-do (KR); Ahron Yang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 139 days.

(21) Appl. No.: 13/778,747

(22) Filed: Feb. 27, 2013

(65) Prior Publication Data

US 2014/0092270 A1   Apr. 3, 2014

(30) Foreign Application Priority Data

Sep. 28, 2012 (KR) .................. 10-2012-0108960

(51) Int. Cl.
*H04N 5/225* (2006.01)
*H04N 5/232* (2006.01)
*H04N 1/00* (2006.01)

(52) U.S. Cl.
CPC ...... *H04N 5/23229* (2013.01); *H04N 5/23222* (2013.01); *H04N 1/00488* (2013.01)

(58) Field of Classification Search
None
See application file for complete search history.

(56) References Cited

U.S. PATENT DOCUMENTS

| | | | |
|---|---|---|---|
| 6,118,485 A * | 9/2000 | Hinoue | G06F 1/1632 348/220.1 |
| 6,686,958 B1 * | 2/2004 | Watanabe et al. | 348/231.1 |
| 2004/0246342 A1 * | 12/2004 | Kim et al. | 348/207.99 |
| 2005/0140797 A1 * | 6/2005 | Moon | 348/231.99 |
| 2006/0067670 A1 * | 3/2006 | Misawa | 396/226 |
| 2006/0147193 A1 * | 7/2006 | Yamamoto | 396/283 |
| 2009/0096896 A1 * | 4/2009 | Imafuji et al. | 348/234 |
| 2009/0251557 A1 * | 10/2009 | Kim et al. | 348/222.1 |
| 2010/0066677 A1 * | 3/2010 | Garrett et al. | 345/163 |
| 2013/0222645 A1 * | 8/2013 | Bilcu | G06T 9/00 348/239 |

FOREIGN PATENT DOCUMENTS

JP    2003244510 A  *  8/2003  ............. H04N 5/225

OTHER PUBLICATIONS

Translation of JP2003-244510 A Author: Fukuda et al. Date: Aug. 2003.*

* cited by examiner

*Primary Examiner* — Twyler Haskins
*Assistant Examiner* — Wesley J Chiu
(74) *Attorney, Agent, or Firm* — Cha & Reiter, LLC

(57) ABSTRACT

A method and electronic device reproducing a multiple shutter sound that reproduces a same shutter sound or a series of different shutter sounds during the period where an image is being processed by transmitting two or more interrupts to a controller by an image signal processor and an electronic device thereof. The repetitive shutter sounds can indicate to a user that the image is still being processed, so that the user does not move the camera and affect the capture of the image. The method of reproducing a multiple shutter sound includes: receiving a command for shooting a photograph; processing an image in response to the command; and transmitting at least two interrupt to a controller such that the shutter sound is reproduced at least twice while processing the image.

22 Claims, 6 Drawing Sheets

METHOD OF REPRODUCING MULTIPLE SHUTTER SOUND AND ELECTRIC DEVICE THEREOF

CLAIM OF PRIORITY

This application claims the benefit under 35 U.S.C. §119(a) from a Korean patent application filed on Sep. 28, 2012 in the Korean Intellectual Property Office and assigned Serial No. 10-2012-0108960, the entire disclosure of which is hereby incorporated by reference in its entirety.

BACKGROUND OF THE INVENTION

1. Field of the Invention

The present invention relates to a method of reproducing a shutter sound and an electronic device. More particularly, the present invention relates to a method of reproducing a shutter sound to provide a user of an electronic device such as a portable terminal with feedback as to the state of readiness of the electronic device.

2. Description of the Related Art

A camera is often included as a module in a current portable terminal reproduces only one type of shutter sound while capturing a still image (i.e. during shooting of a photograph). The shutter sound is reproduced only once at a time during processing an image or after termination of the processing the image when the user presses a shooting button to shoot a photograph according to a preset state of a camera.

As the user detects a shooting state of a camera depending on whether he/she heard the shutter sound, the user may move the camera or terminate a photograph shooting application when the shutter sound is not reproduced. Accordingly, when the shutter sound is reproduced before terminating processing the image, the photograph is shot in a shaken state or a photograph shooting application may be terminated in a state that the photograph is not generated. Particularly, when an exposure shooting function is used for a long time or an image processing operation is delayed, there is a problem that the user does not obtain a satisfactory photograph. Thus there is a long-felt need in the art to provide a user with more information to assist in utilizing the camera module of a portable device.

SUMMARY OF THE INVENTION

The present invention has been made at least in part in view of the above problems, and provides a method and electronic device that reproduces a multiple shutter sound which reproduces a plurality of shutter sounds from a shooting start time to a shooting terminating time.

The present invention further provides a method and electronic device for reproducing a multiple shutter sound which transmits at least two interrupts to an application processor (AP) by an image signal processor (ISP) so that the AP reproduces a plurality of shutter sounds.

In accordance with an exemplary aspect of the present invention, a method of reproducing a multiple shutter sound, preferably includes: receiving a command for shooting a photograph; processing an image in response to the command; and transmitting at least two interrupts to a controller so that the shutter sound is reproduced at least twice while processing the image. The at least two interrupts are transmitted to the controller using an interrupt pin as a shutter sound interrupt. The at least two interrupts are transmitted to the controller is a number set by a user or a manufacturing company, and it is within the spirit and scope of the claimed invention that the number could be greater or it could be a changeable default of at least two. The at least two interrupts are transmitted to the controller in a predetermined time interval while processing the image. The processing of the image preferably includes: receiving an optical signal with respect to a subject through a lens unit; converting the optical signal into an electric signal; converting the electric signal into a digital signal; and processing the digital signal in a form adapted for the controller to process.

In accordance with another exemplary aspect of the present invention, a method of reproducing a multiple shutter sound, further includes transmitting the image processing performing result to the controller.

In accordance with another exemplary aspect of the present invention, an electronic device preferably includes: a lens unit receiving an optical signal with respect to a subject; an image sensor converting the optical signal into an electric signal; and an image signal processor (ISP) processing an image based on the electric signal in response to a command for shooting a photograph when the command is received and transmitting at least two interrupts for reproducing a shutter sound at least twice to a controller while processing the image. The image signal processor transmits the at least two interrupts to the controller using an interrupt pin. However, the image signal processor can transmit a preset/predetermined number of interrupts to the controller by a user or a manufacturer. The image signal processor transmits the interrupt in a predetermined time interval while processing the image.

In accordance with another exemplary aspect of the present invention, a method of reproducing a multiple shutter sound preferably includes: receiving a request for shooting a photograph; processing an image for shooting the photograph in response to the request; and reproducing a shutter sound at least twice while processing an image.

In accordance with another exemplary aspect of the present invention, a method of reproducing a multiple shutter sound, further includes: receiving setting of the reproduced number of times of the shutter sound, wherein the reproducing of the shutter sound comprises reproducing the shutter sound by the received reproduced number of times. The receiving of the request preferably comprises reproducing a first shutter sound in response to the request. The reproducing of the shutter sound at least twice includes reproducing different shutter sounds based on a performing state of processing the image. The reproducing of the shutter sound at least twice preferably includes: receiving at least two interrupts from an image signal processor; and reproducing the shutter sound according to the reception of the interrupt. The processing of the image includes: transmitting a command for shooting the photograph to an image signal processor in response to the request; and receiving an image signal processing result in response to the command from the image signal processor.

In accordance with another exemplary aspect of the present invention, a method of reproducing a multiple shutter sound, further includes displaying a photograph shooting result according to the processing the image when the processing of the image is terminated.

In accordance with another exemplary aspect of the present invention, an electronic device preferably includes: an input unit receiving user input; a sound output unit outputting a sound; and a controller controlling to process an image for shooting a photograph in response to a request for shooting the photograph when the request is received through the input unit, and to reproduce a shutter sound at least twice while processing the image to output the shutter sound through the sound output unit. The controller receives through the input unit the reproduced number of times of the shutter sound, and reproduces the shutter sound as much as the inputted reproduced number of times. The controller receives at least two interrupts from an image signal processor, and reproduces the shutter sound according to the reception of the interrupts.

BRIEF DESCRIPTION OF THE DRAWINGS

The exemplary objects, features and advantages of the present invention will become more apparent to a person of ordinary skill in the art from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

The present invention is applicable to control reproducing of a shutter sound of an electronic device providing a camera function.

Further, the present invention is applicable to a plethora of various devices providing a camera function as well as general electronic terminals such as a smart phone, a portable terminal, a mobile terminal, a Personal Digital Assistant (PDA), a Portable Multimedia Player (PMP) terminal, a notebook computer, a Note Pad, a Wibro terminal, a Tablet PC, a smart TV, a digital camera, a smart camera, and a meca shutter camera as a terminal providing the camera function, just to name a few non-limiting possibilities.

Figure 1:
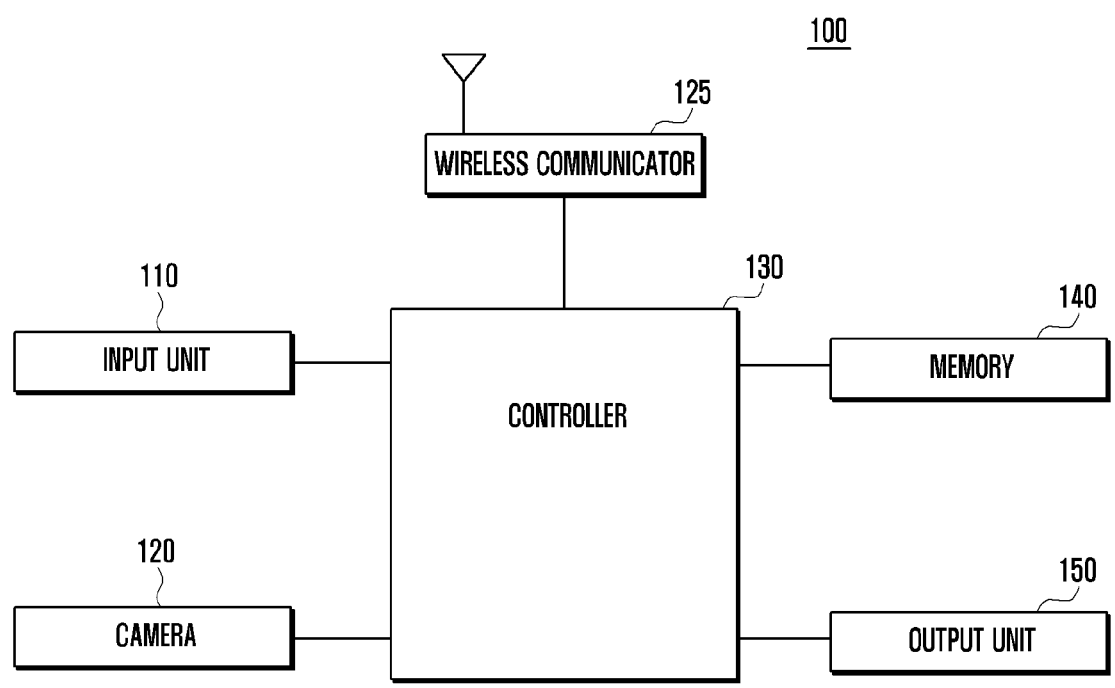
FIG. 1 is a block diagram illustrating a configuration of an electronic device according to an exemplary embodiment of the present invention.

FIG. 1 is a block diagram illustrating a configuration of an electronic device according to an exemplary embodiment of the present invention.

Referring now to FIG. 1, the electronic device 100 may include an input unit 110, a camera 120, a controller 130, a memory 140, and an output unit 150. the output unit comprises hardware, such as a display, touchscreen, etc.

The input unit 110 may generate an operation signal according to the input of the user. The input unit 110 may be configured as a key pad, a dome switch, a jog wheel, or a jog switch. The input unit 110 may include a touch sensor, a pressure sensor, a proximity sensor, and/or an electro-magnetic sensor. The input unit 110 may be configured in the form of a pad such as a touch pad (constant pressure/capacitive), an Electro Magnetic Resonance (EMR) pad, and an Electro Magnetic Interference (EMI) pad. The input unit may detect input of a user through sensors, that is, by various input means such as a body (e.g., hand) of the user, a physical tool, and a stylus pen. The input unit 110 may include a plurality of pads forming a layer structure. It is also within the scope of the claimed invention that the input unit can be configured for voice detection.

The input unit 110 may have a layered structure with a display unit constituting the output unit 150 to act additionally as an input screen. For example, the input unit 110 may include an input pad having a touch sensor and may be configured by a Touch Screen Panel (TSP) coupled with the display unit constituting the output unit 150.

The camera 120 shoots a subject to output an electric signal under control of the controller 130.

Figure 2:
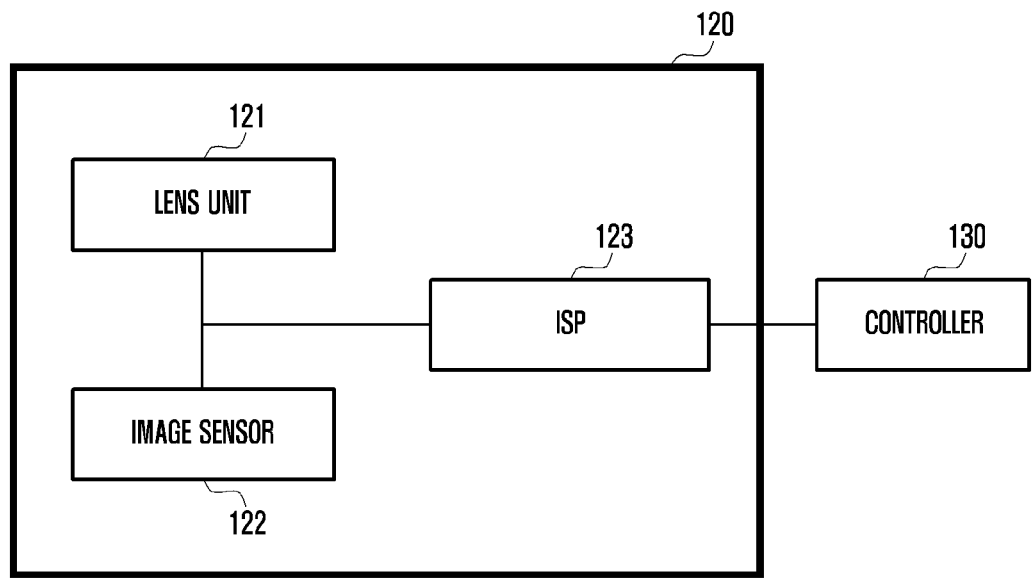
FIG. 2 is a block diagram illustrating a configuration of a camera according to an exemplary embodiment of the present invention in detail.

Referring now to FIG. 2, the camera 120 may include a lens unit 121, an image sensor 122 (non-limiting examples being a charge coupled device (CCD) or CMOS sensor) converting an optical signal with respect to a subject projected from the lens 121 into an electric signal, and an image signal processor (ISP) 123 processing and converting a signal output from the image sensor 122 into a digital signal, and converting the digital signal into a format suited to be processed by the controller 130. The lens unit 121 is configured by at least one lens, and receives light to collect an image and to provide the collected image to the image sensor 122. The image sensor 122 is configured by a CMOS imaging device or a CCD imaging device, outputs a current or a voltage proportional to brightness of the collected image to convert the image into an electric signal. The image sensor 122 generates signals for each pixel of an image and sequentially outputs the signals in synchronization with a clock. The ISP 123 converts the signal output from the image sensor 122 into a digital data. The ISP 123 may include a CODEC compressing the converted digital data to a JPEG format or an MPEG format. The converted digital data from the ISP 123 may be processed to a preview image or a compressed image and the image may be transferred to the controller 130. The preview image and the compressed image may be processed to interleaved data and the interleaved data may be transferred to the controller 130. The preview image is displayed on the display unit 150 and refers to resizing suited to the size of a display region of the display unit. It is also within the spirit and scope of the invention that a preview screen may be provided typically on the side of a view that a user looks through to center and focus an image. The controller 130 having received data from the ISP 123 may control the display unit to display the preview image.

In addition, the camera 120 may include a tube (not shown) adjusting a length between the lens 121 and the image sensor 122 and a motor pulling out the tube from the camera 120 or putting the tube in the camera 120. In other words, the distance between the lens 121 and image sensor is variable via extension or contractions of the tube.

A wireless communicator 125 may include a transceiver for wireless communication to/from a base station, access point, network server, etc. There can be transmissions in a number of different wireless protocols, IP, radio frequency, near field, television, etc.

According to an exemplary embodiment of the present invention, the ISP 123 may transmit at least two interrupts to the controller 130 while processing an image signal. In this exemplary embodiment the interrupt comprises a sound interrupt, and the ISP 23 may transmit the sound interrupt to the controller 130 using an interrupt pin so that the shutter sound is reproduced. The ISP 123 transmits at least two interrupts to the controller 130 so that the shutter sound may be reproduced twice or more.

The controller 130, which comprises hardware, may control respective constituent elements for an overall operation of the terminal 100. For example, when shooting the photograph, the controller 130 may control the electronic device 100 to reproduce the multiple shutter sound.

The controller 130 may also include a storage device storing software for controlling respective constituent elements. The controller 130 may store an Operating System (OS) for controlling overall control of the electronic device 100 in the storage device. The OS may have an optional platform. For example, the platform may be Android, WIPI, Brew, IOS, Windows Mobile, Symbian, or BADA. The platform may include an application and a middle ware for controlling various functions of the electronic device 100. The controller 130 may allocate a kernel for controlling the electronic device 100 to the storage device. The kernel provides various services to the application and may include a driver and a CODEC.

According to an exemplary embodiment of the present invention, when a request for performing shooting a photograph is received, the controller 130 may control the camera 120 and the ISP 123 of the camera 120 to process an image for shooting a photograph in response to the request. While processing the image, the controller 130 reproduces a shutter sound at least twice and controls a sound output unit to output the shutter sound. In this case, the controller 130 may receive at least two interrupts from the ISP 123 to reproduce the shutter sound at least twice according to the received interrupt. It is also within the spirit and scope of the claimed invention that a shutter sound having a duration of twice the length of a shutter sound with one interruption may be reproduced. Also, it is within the spirit and scope of the claimed invention that the sound, while preferably being a shutter sound, could be a different kind of tone, or beep. While the shutter sound gives one familiar with quality cameras the "feel" of such camera, and thus making two, or three, or a predetermined number of shutter sounds is preferable, the claimed invention is broader and not limited to the shutter sound.

A detailed operation of the controller 130 will now be described with reference to the accompanying drawings.

The memory 140, which comprises a non-transitory machine readable medium, may store programs or commands for the electronic device 100. The controller 130 may perform the programs or the commands stored in the memory 140.

The memory 140 may include a storage medium having at least one type of a flash memory type, a hard disk type, a multimedia card micro type, a card type of a memory (for example, an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc.

According to an exemplary embodiment of the present invention, the memory 140 may store the reproducing number of a shutter sound inputted by user input or by a manufacturer during manufacture. The memory 140 may store at least one sound file as the shutter sound.

According to the exemplary embodiment of the present invention, the memory 140 may permanently or temporarily store a photograph according to a user request.

The output unit 150 may include a display unit outputting an image and/or a sound output unit outputting a sound.

The display unit displays (outputs) information processed by the electronic device 100. For example, the display unit may display User Interface (UI) Graphic User Interface (GUI) associated with an electronic book.

The display unit 150 may include at least one of a liquid crystal display (LCD), a thin film transistor-liquid crystal display (TFT LCD), an organic light-emitting diode (OLED), a flexible display, and a 3D display.

The display unit may have a mutual layered structure with a touch sensor and/or an electromagnetic sensor included in the input unit 110 and act as a touch screen. In this case, the display unit acting as the touch screen may perform a function of an input device.

The sound output unit may output audio data received from the outside or stored in the memory 140 in a call signal receiving mode, a call mode, a recording mode, a voice recognition mode, and a broadcasting receiving mode. The sound output unit outputs a sound signal associated with a function (e.g., camera shutter sound) performed by the electronic device 100. The sound output unit may include a receiver, a speaker, and a buzzer.

According to the exemplary embodiment of the present invention, the output unit 150 may output a shutter sound at least twice while processing an image according to a photograph shooting request of the user.

Constituent elements shown in FIG. 1 are not essential, and the electronic device 100 having more or fewer constituent elements shown in FIG. 1 may be implemented.

Figure 3:
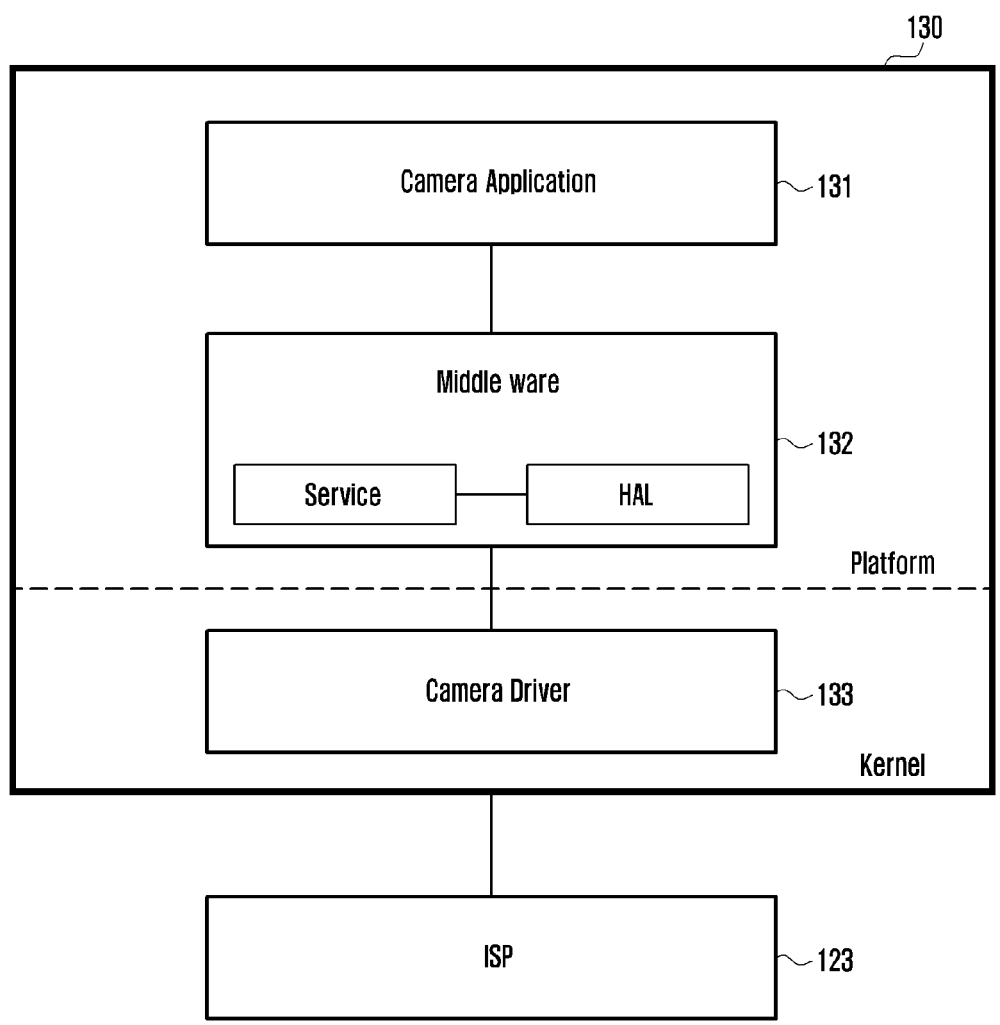
FIG. 3 is a block diagram illustrating a software arrangement of the electronic device loaded into hardware for execution according to an exemplary embodiment of the present invention.

FIG. 3 is a block diagram illustrating a software arrangement of the electronic device according to an exemplary embodiment of the present invention. It is understood that these items are executed in the controller 130.

Referring now to FIG. 3, the electronic device 100 according to the present invention may include software for operating a controller 130 and an ISP 123. The software comprises machine executable code. The controller may have its own storage that works in conjunction with memory 140 to store the machine executable code.

A software structure of the controller 130 may be divided into the platform and the kernel.

The platform is system software which provides an abstraction layer such that a hardware resource of the electronic device 100 may be directly managed and the application may easily use the hardware resource. The platform may include an application and a middle ware 132 layer. The application is a part in which basic application of the electronic device 100 such as call, a phone-book, and a message function are located, and may be generated using a function provided from an application framework. According to the exemplary embodiment of the present invention, the application includes a camera application 131. The middle ware 132 may be composed of a service and a Hardware Abstraction Layer (HAL). The server may include library for a fundamentally providable service. The HAL abstracts between hardware and software depending on a software driver.

The kernel is software for providing various fundamental services to all parts. According to the exemplary embodiment of the present invention, the kernel may include a camera driver 133.

The ISP 123 may include software for processing an image signal, and may exchange information with a kernel layer of the controller 130.

Figure 4:
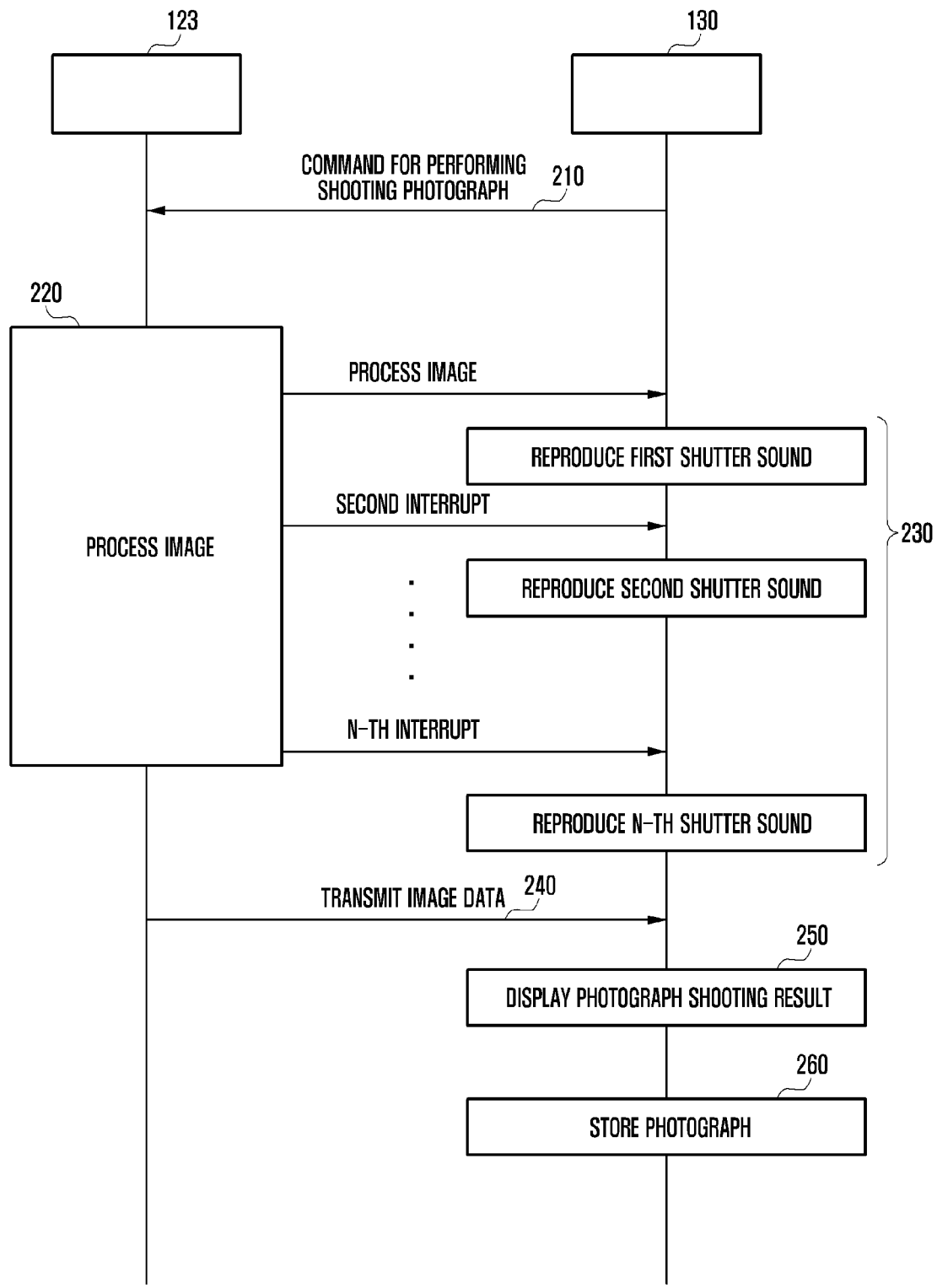
FIG. 4 is a flowchart illustrating exemplary operation of a procedure of reproducing a shutter sound according to an exemplary embodiment of the present invention.

FIG. 4 is a flowchart illustrating exemplary operation of a procedure of reproducing a shutter sound according to an exemplary embodiment of the present invention. Referring now to FIG. 4, the procedure of reproducing a shutter sound according to an exemplary embodiment of the present invention may be achieved by following sequences between ISP 123 and controller 130.

First, at (S210) the controller 130 transmits a command to perform shooting a photograph to the ISP 123.

If necessary according to a specific user request or driving of an application, a service, and a program, the controller 130 may drive the camera application 131. If the camera application 131 is driven, the controller 130 may transmit an image signal processing command to the ISP 123. The ISP 123, having received the image signal processing command, processes an image signal with respect to a subject and transmits the processed command to the controller 130 in the form of preview data. The controller 130 may control a display unit to display a preview image based on the received preview data.

The controller 130 may receive a request for shooting a photograph through an input unit 110. The request may entail pressing an icon to shoot the photograph. The camera function may have been previously activated via camera icons that activates the camera lens and changes the display of the electronic device to show what is currently being captured by the lens of the camera. If receiving the request for performing shooting a photograph, the controller 130 transmits a command for performing shooting a photograph to the ISP 123.

If receiving the command for performing shooting a photograph, at (220) the ISP 123 processes an image.

The ISP 123 processes an image in response to the command for shooting a photograph. In more detail, the lens unit 121 transfers an optical signal received from the subject to an image sensor 122. The image sensor 122 converts the optical signal into an electric signal and transfers the electric signal to the ISP 123. In turn, the ISP 123 converts the received electric signal into a digital signal and processes the digital signal in a form which the controller 130 can process. The ISP 123 may compress the electric signal to a format such as JPG, JPEG, or MPEG.

At 230, the ISP 123 transmits an interrupt to the controller 130 while processing the image.

The interrupt is a shutter sound interrupt, and is a signal which enables the controller 130 to reproduce a shutter sound. The interrupt may be transmitted to the controller 130 using an interrupt pin. If receiving an interrupt from the ISP 123, the controller 130 reproduces the shutter sound stored in the memory 140 and controls the output unit 130 to output the shutter sound.

The ISP 123 transmits at least two (i.e. two or more) interrupts to the controller 130 while processing the image. The ISP 123 transmits the at least two interrupts to the controller 130 so that the controller 130 reproduces the shutter sound at least twice while processing the image. In this case, the ISP 123 may transmit the preset number of the interrupt to the controller 130. The ISP 123 may set the transmission number of times of the interrupt by the user, or by a manufacturer during manufacture of the electronic device 100. When the transmission number of times of the interrupt is set by the user, the ISP 123 may receive data for setting the transmission number of times of the interrupt from the controller 130. The ISP 123 may transmit the interrupt to the controller 130 based on the preset transmission number of times of the interrupt. The ISP 123 may transmit the interrupt in a predetermined time interval while processing the image. In other words, the ISP 123 may divide a total image processing performing time in a predetermined time interval according to the transmission number of times of the interrupt and transmit the interrupt to the controller 130 for each time interval. In this case, the ISP 123 may include at least one of a starting time of image processing and a termination time of the image processing and may transmit a preset number of the interrupts. If receiving at least two interrupts from the ISP 123, the controller 130 plurally reproduces a shutter sound stored in the memory 140. Whenever the interrupt is received from the ISP 123, the controller 130 reproduces the shutter sound. In this case, the controller 130 may reproduce different shutter sounds according to the received number of times of the interrupt. The shutter sound corresponding to the received number of times of the interrupt may be set by the user or a manufacturer during manufacture of the electronic device 100.

Referring now to FIG. 4, the image signal processor 123 transmits N interrupts including a first interrupt, a second interrupt, and an N-th interrupt to the controller 130 while performing the image. Then N may be the produced number of times of a shutter sound previously set by the user or a manufacturer. The image signal processor 123 may sequentially transmit N interrupts to the controller 130 in a predetermined time interval. Particularly, in an example of FIG. 4, the ISP 123 may transmit the N-th interrupt to the controller 130 at an image signal processing termination time. The controller 130, having received the interrupt from the image signal processor 123, reproduces the shutter sound. In this case, the controller 130 may reproduce a first shutter sound corresponding to a first interrupt and reproduce an N-th shutter sound corresponding to an N-th shutter sound. Respective shutter sounds may be different from each other.

At (240), when the image processing is terminated, the ISP 123 transmits image data to the controller 130.

The ISP 123 transmits image data according to an image processing result to the controller 130. The image processing result may be data for a preview image or a compressed image.

At (250), if the image data are received, the controller 130 may display a photograph shooting result.

The controller 130 may display a photograph that was taken according to a photograph shooting request of the user based on the image data as the photo shooting result. In this case, the controller 130 may temporarily or permanently store the photograph in the memory 140 according to an automatic storage setting state of the electronic device 100.

At (260), the controller 130 may store the photograph.

If a user request for storing the photograph is generated in a state that the photograph shooting result is displayed, the controller 130 may store the photograph in the memory 140. The controller 130 may store meta data with respect to the photograph together with the photograph, and the meta data may include a compressed type, a shot date, and a shot place of the photograph.

Figure 5:
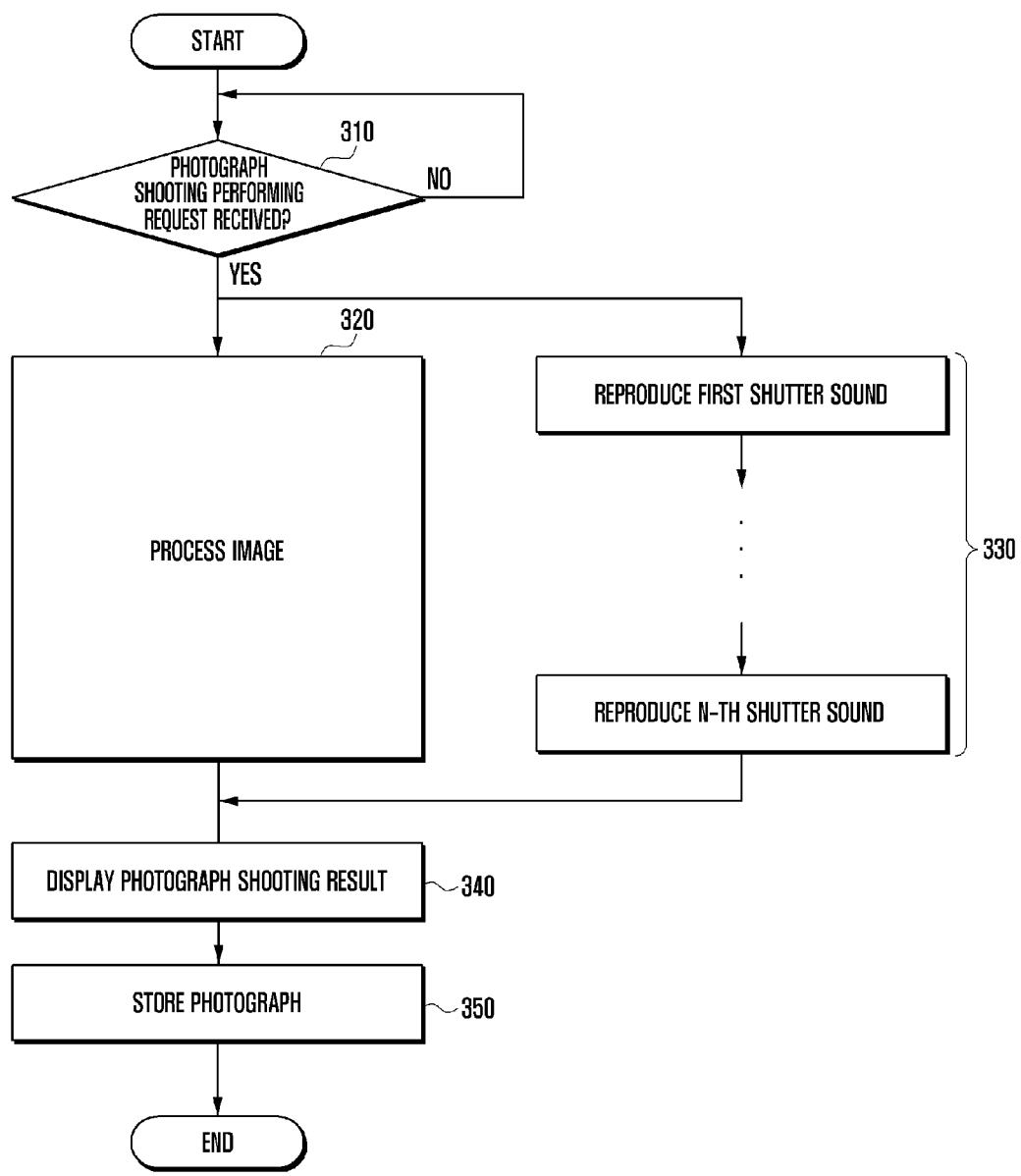
FIG. 5 is a flowchart illustrating exemplary operation of a method of reproducing a shutter sound of an electronic device according to an exemplary embodiment of the present invention.

FIG. 5 is a flowchart illustrating exemplary operation of a method of reproducing a shutter sound of an electronic device according to an exemplary embodiment of the present invention.

Referring now to FIG. 5, the method of reproducing a shutter sound of an electronic device according to an exemplary embodiment of the present invention may be achieved by following sequences.

First, at (310) the controller 130 determines whether a photograph shooting performing request is received.

If necessary according to the user request or driving of an application, a service, and a program, the controller 130 may drive a camera application 131. If the camera application 131 is driven, the controller 130 may process an image signal with respect to a subject and controls the display unit to display a preview image. The preview image may automatically be displayed upon activation of the camera application to ready the electronic device to capture an image as a photograph (or a moving image). In detail, the controller 130 may transfer an image processing command to the ISP 123, and receives a preview image as a response to a command from the ISP 123 and displays the preview image through the display unit.

The controller 130 may receive at (310) a photograph shooting performing request through an input unit 110. In a state that the preview image is displayed, the input unit 110 may detect the photograph shooting performing request. For example, the photograph shooting performing request may be generated through a shutter button operation, touch input, proximity input, pressure input, and voice input. If the photograph shooting performing request is detected, the input unit 110 generates and transfers an input signal corresponding to the photograph shooting performing request to the controller 130. The controller 130 may determine whether the photograph shooting performing request is received based on the input signal.

Figure 6:
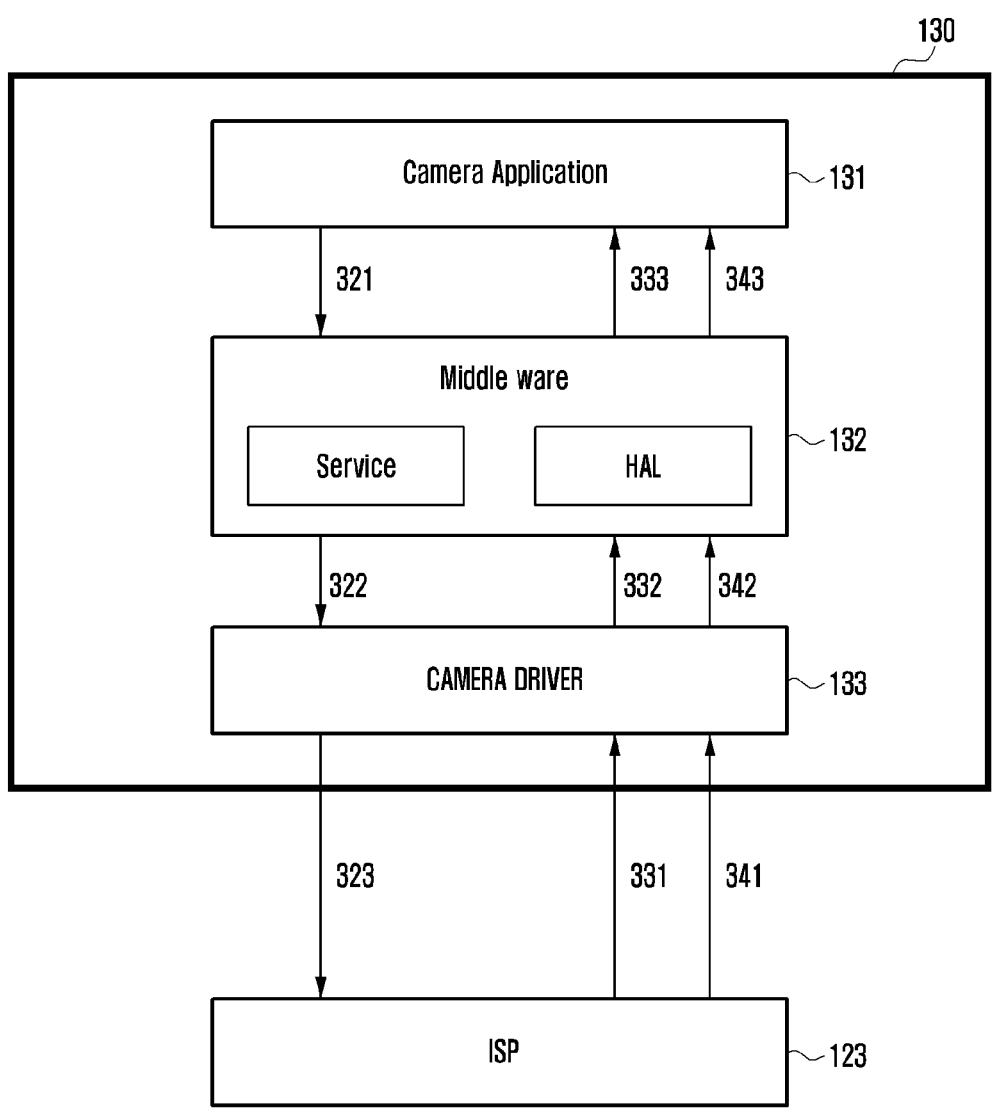
FIG. 6 is a flowchart illustrating exemplary operation of a procedure of processing an image of an electronic device according to an exemplary embodiment of the present invention.

At (320) if the photograph shooting performing request is received, the controller 130 processes an image. In more detail, referring to FIG. 6, the controller 130 transfers a photograph shooting command to a middle ware 132 through a camera application 131. A service receives a photograph shooting command and then transfers a command to a Hardware Abstraction Layer (HAL) inside the middle ware 132. At (322), the HAL transmits the received command to a camera driver of a kernel, and at (323) the camera driver transfers the command to the camera 120 so that the ISP 123 of the camera 120 may process an image for shooting the photograph.

The camera 120 having received the command, internally performs a procedure of processing an image signal for shooting the photograph. In detail, the lens unit 121 transfer the optical signal received from the subject to the image sensor 122. The image sensor 122 may convert the optical signal into an electric signal and transfer the electric signal to the ISP 123. The ISP 123 converts the received electric signal into a digital signal and adjust the signal to a form which can be processed by the controller 130. The ISP 123 may compress an image of the electric signal with a format such as JPG, JPEG, or MPEG.

According to the exemplary embodiment of the present invention, the controller 130 may reproduce a first shutter sound according to the photograph shooting performing request. The first shutter sound may be a sound for reporting the start of shooting the photograph or a sound for reporting the start of image processing. At (330), while processing the image, the controller 130 reproduces a shutter sound at least twice (330).

In detail, the camera driver 133 waits for reception of the interrupt while the camera 120, that is, the signal processor 123 processes the image. The ISP 123 transmits at least two interrupts to the camera driver 133 while processing the image (331). The interrupt is a shutter sound interrupt, and is a signal for reproducing the shutter sound by the controller 130. The interrupt may be transmitted to the camera driver 133 using an interrupt pin.

In this case, the ISP 123 may transmit the preset number of interrupts to the camera driver 133. The ISP 123 may be set with the transmission number of times of the interrupts by the user or a manufacturer during manufacture of the electronic device. When the transmission number of times of the interrupts is set by the user, the ISP 123 may receive data for setting the transmission number of times from the controller 130. The ISP 123 may transmit the interrupt to the camera driver 133 based on the preset transmission number of times of the interrupts. The ISP 123 may transmit the interrupt to the camera driver 133 in a predetermined time interval while processing the image. In other words, the ISP 123 may divide a total image processing performing time at a predetermined time interval according to the transmission number of times of the interrupts to transmit the interrupt for each time interval to the camera driver 133. In this case, the ISP 123 may include at least one of a starting time of the image processing and a terminating time of the image processing and transmit the preset number of interrupts. These shutter sounds indicate to the user that the camera is in the process of capturing the image.

The camera driver 133 having received the interrupt transfers shutter callback to the middle ware 132. The HAL of the middle ware 132 internally receives the shutter call-back and transfers the shutter call-back to the service. The middle ware 132 having received the shutter ball-back transfers the shutter call-back to the camera application 131. The camera application 131 having received the shutter call-back, reproduces the shutter sound to be provided to an application. When receiving at least two shutter call-backs, the camera application 131 multiply reproduces the shutter sound stored in the memory 140. That is, whenever receiving an interrupt from the ISP 123, the camera application 131 reproduces the shutter sound. In this case, the camera application 131 may reproduce different shutter sounds according to the received number of times of the interrupts. The shutter sound corresponding to the received number of times of the interrupts may be set by the user by changing a setting or in response to a prompt, or by the manufacturer during manufacture of the electronic device 100.

With continued reference to FIG. 5, at (340) if the image processing is terminated, the controller 130 displays a photograph shooting result.

The ISP 123 transmits image data according to the image processing result. The image processing result may be data for a preview image or a compressed image. At (341) (FIG. 6), the ISP 123 transfers the image processing result to the camera driver 133, and at (342) the camera driver transfers the image processing result to the middle ware 132. At (343), the middle ware 132 may transfer the image processing result to the camera application 131 so that the photograph shooting result may be displayed through the camera application 131.

If the image data are received, the controller 130 may display the photograph shooting result. The controller 130 may display the shot photograph according to the photograph shooting request of the user as the photograph shooting result based on the image data. In this case, the controller 130 may temporarily or permanently store the shot photograph according to an automatic storage setting state of the electronic device 100.

Moreover, at (350) the controller 130 may store the photograph.

If the user request for storing the photograph is generated in a state that the photograph shooting result is displayed, the controller 130 may store the photograph in the memory 140. The controller 130 may store meta data with respect to the photograph together with the photograph, and the meta data may include a compressed type, a shot date, and a shot place of the photograph.

The method of reproducing a multiple shutter sound and an electronic device thereof according to the present invention reproduce a plurality of shutter sounds from a starting time of the shooting to a terminating time of the shooting so that the user can recognize a shot state of the camera. In addition, the method of reproducing a multiple shutter sound and an electronic device thereof according to the present invention enable the user to control the device with more accuracy than ever known heretofore.

The above-described methods according to the present invention can be implemented in hardware, firmware or as software or computer code loaded into hardware that is stored in a non-transitory recording medium such as a CD ROM, flash, EPROM, EEPROM, RAM, a floppy disk, thumbnail drive, a hard disk, or a magneto-optical disk or computer code downloaded over a network originally stored on a remote recording medium and then stored on a non-transitory medium and loaded into hardware such as a processor or microprocessor. The machine executable code stored on the non-transitory machine readable medium can be stored on a local recording medium, and loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor, microprocessor or other hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "unit" and "microprocessor" under the broadest reasonable interpretation constitute hardware in the claimed invention consistent with a statutory invention in compliance with 35 U.S.C. §101. Finally, the claimed invention can include the use of a location information server comprising more than one server, such as a proxy server.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of reproducing a multiple shutter sound, the method comprising:
    receiving by a controller a command for shooting a photograph;
    processing by an image signal processor an image output from an image sensor in response to the command for shooting a photograph;
    transmitting by the image signal processor to the controller at least three shutter sound interrupts based on a number of times of transmission interrupt, as set by a user, during the image processing of a single frame of the image output, the at least three shutter sound interrupts being transmitted to the controller using an interrupt pin; and
    outputting the shutter sound at least three times in response to the at least three shutter sound interrupts,
    wherein at least one shutter sound interrupt is transmitted between a starting time of the image processing and a termination time of the image processing.

2. The method of claim 1, wherein a same shutter sound is generated in a quantity corresponding to a number of transmitted interrupts.

3. The method of claim 1, wherein a different shutter sound is generated in a respective quantity corresponding to a number of transmitted interrupts.

4. The method of claim 1, wherein generated shutter sounds have a total duration equal to a time to the image signal processor processes the image.

5. The method of claim 1, wherein the at least three shutter sound interrupts comprise three or more shutter sound interrupts that are transmitted to the controller according to a quantity set by a user or a manufacturing company.

6. The method of claim 1, wherein the at least three shutter sound interrupts are transmitted to the controller over a predetermined time interval while processing the image.

7. The method of claim 1, wherein the processing of the image comprises:
    receiving an optical signal with respect to a subject through a lens unit;
    converting the optical signal into an analog electric signal;
    converting the analog electric signal into a digital signal; and
    processing the digital signal in a form adapted for the controller to process.

8. The method of claim 1, further comprising transmitting, by the image signal processor, the processed image output to the controller.

9. An electronic device comprising:
    a lens unit receiving an optical signal with respect to a subject;
    an image sensor converting the optical signal into an electric signal; and
    an image signal processor (ISP) that receives the electric signal from the image sensor processing an image output based on the electric signal; and
    a controller that forwards a command for shooting a photograph to the ISP,
    wherein in response to the ISP receiving the command for shooting a photograph, the ISP transmits at least three shutter sound interrupts to the controller for reproducing a shutter sound based on a number of times of transmission interrupt, as set by a user, during the image processing of a single frame of the image output, and the at least three shutter sound interrupts is transmitted to the controller using an interrupt pin,
    wherein the shutter sound is output at least three times in response to the at least three shutter sound interrupts, and
    wherein at least one shutter sound interrupt is transmitted between a starting time of the image processing and a termination time of the image processing.

10. The electronic device of claim 9, wherein the at least three shutter sound interrupt comprises a preset plurality of shutter sound interrupts transmitted by the ISP to the controller as set by a manufacturer or by a user changeable default.

11. The electronic device of claim 9, wherein the ISP transmits the at least three shutter sound interrupts over a predetermined time interval while processing the image.

12. The electronic device of claim 9, further comprising a wireless transceiver, and input unit comprising a touch screen, and an output unit including a display for previewing an image captured by an image sensor, and an audio unit configured for outputting shutter sound.

13. A method of reproducing a multiple shutter sound, the method comprising:
receiving by an input unit a request for shooting a photograph;
processing an image output by an image signal processor in response to the request for shooting a photograph;
receiving at least three shutter sound interrupts from the image signal processor based on a number of times of transmission interrupt, as set by a user, during the image processing of a single frame of the image output, the at least three shutter sound interrupts being received from the image signal processor using an interrupt pin; and
reproducing a shutter sound by an output unit at least three times in response to the at least three shutter sound interrupts,
wherein at least one shutter sound is output between a starting time of the image processing and a termination time of the image processing.

14. The method of claim 13, further comprising:
receiving a setting indicating a number of times that the shutter sound is to be reproduced,
wherein the reproducing of the shutter sound comprises reproducing the shutter sound according to the number of times indicated in the setting.

15. The method of claim 13, wherein the receiving of the request for shooting a photograph includes reproducing a first shutter sound at least three times in response to the request.

16. The method of claim 13, wherein the reproducing of the shutter sound the at least three times comprises reproducing at least three different shutter sounds based on a performing state of processing the image.

17. The method of claim 13, wherein the reproducing of the shutter sound at least three times comprises:
reproducing a respective shutter sound according to reception of each shutter sound interrupt of the at least three shutter sound interrupts.

18. The method of claim 13, wherein the processing of the image comprises:
transmitting by a controller a command for shooting the photograph to the image signal processor in response to the request; and
receiving an image signal processing result in response to the command sent to the image signal processor.

19. The method of claim 13, further comprising displaying a photograph shooting result according to the processing of the image when the processing of the image is terminated.

20. An electronic device comprising:
an input unit receiving a user input to request shooting of a photograph;
a sound output unit outputting a shutter sound; and
a controller controlling processing of an image output received by an image signal processor from an image sensor in response to a request for shooting the photograph when the request is received through the input unit, and to reproduce a shutter sound at least three times in response to at least three shutter sound interrupts in which the shutter sound is output through the sound output unit,
wherein the controller receives the at least three shutter sound interrupts from the image signal processor based on a number of times of transmission interrupt, as set by user, during the image processing of a single frame of the image output, the at least three shutter sound interrupts received from the image signal processor using an interrupt pin and at least one shutter sound interrupt received between a starting time of the image processing and a termination time of the image processing.

21. The electronic device of claim 20, wherein the controller receives via the input unit a quantity indicating a number of times of the shutter sound is to be output during image processing, and the sound output unit reproduces the shutter sound in a quantity indicating the number of times that was received by the input unit.

22. The electronic device of claim 20, wherein the controller reproduces the shutter sound according to reception of the shutter sound interrupts.

* * * * *